Patented Feb. 19, 1929.

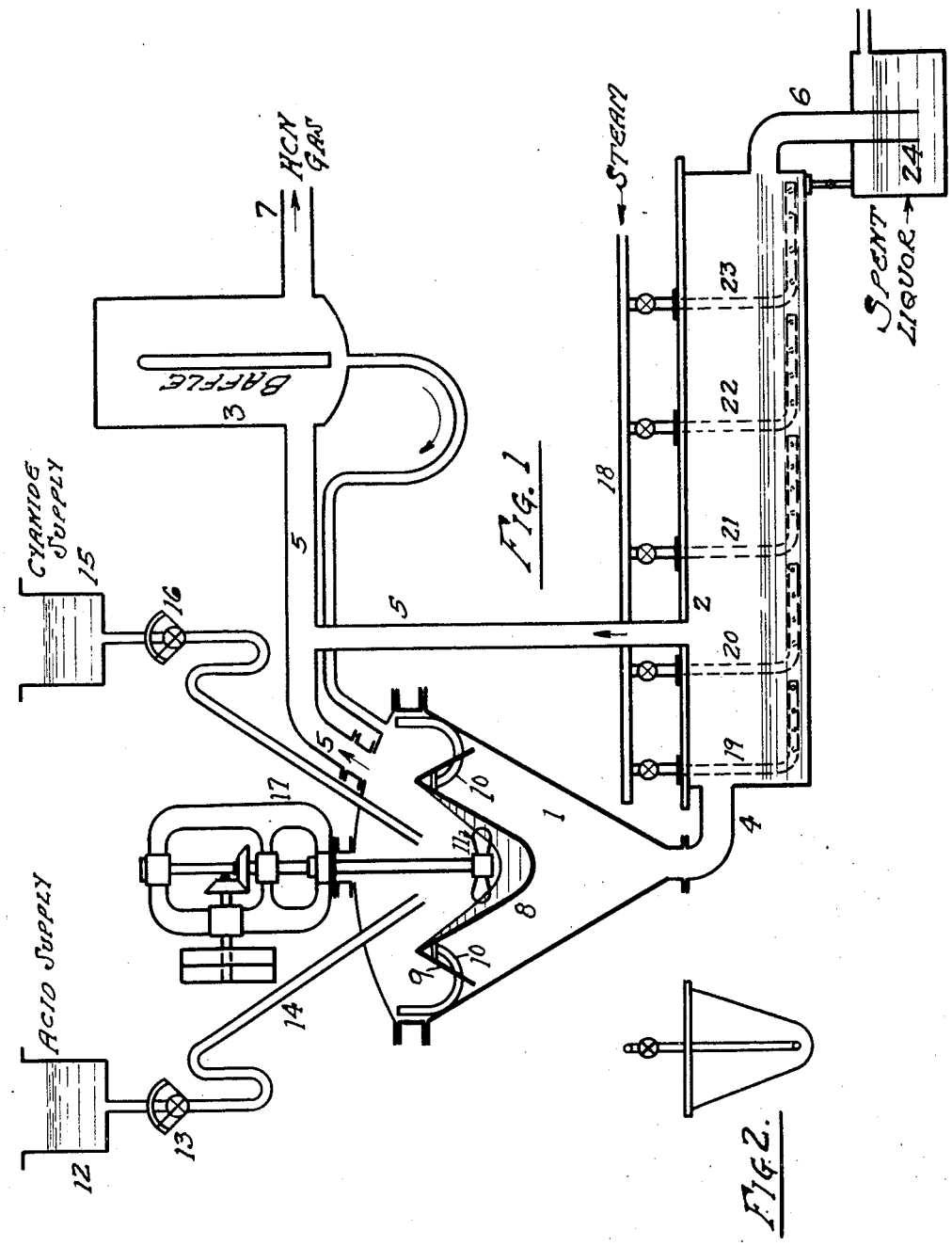

1,702,761

UNITED STATES PATENT OFFICE.

MORTIMER J. BROWN, OF NIAGARA FALLS, NEW YORK, ASSIGNOR, BY MESNE ASSIGNMENTS, TO THE PACIFIC R. & H. CHEMICAL CORPORATION, OF LOS ANGELES, CALIFORNIA, A CORPORATION OF CALIFORNIA.

PROCESS FOR PRODUCING HYDROCYANIC ACID.

Application filed January 11, 1924. Serial No. 685,505.

The object of my invention is to simplify and to cheapen the process of producing hydrocyanic acid from metallic cyanides, particularly the cyanides of alkaline earth metals. Briefly, it is a process of continuously and rapidly mixing sulphuric acid and cyanide solutions or slurries, continuously heating and agitating the mixture and continuously discharging the processed mixture as a sludge or effluent practically free of hydrocyanic acid.

Hydrocyanic acid has been prepared by a variety of processes as regards procedure of mixing and treating the reacting chemicals. In some, solid cyanides are added directly to dilute acid; in others, cyanide solutions or slurries are added to warm dilute acid; in still others, cyanide solution or slurries are added to cold acid; in still others, cyanide solutions or slurries are added to cold dilute acid and the mixture is refrigerated during the mixing operation. In all these processes heating is utilized to drive off the hydrocyanic acid, which heating is either a result of the exothermic chemical reactions or is produced by artificial means, or both.

In a study of the phenomena involved in the production of hydrocyanic acid I have learned the following facts.

1. Hydrocyanic acid in hot acid solutions hydrolyzes to form ammonia compounds. The rate of hydrolysis increases with temperature and acid concentration. However, if there is only a small excess of acid and if the temperature is held below 60° C. the rate of hydrolysis is slow.

2. It is impossible to drive off substantially all of the hydrocyanic acid from a reacted mixture of cyanide and acid without boiling the mixture which necessitates the use of temperatures high enough to cause rapid hydrolysis.

3. It is possible to drive off a large portion of the hydrocyanic acid at temperatures from 60° to 80° C.

There is an effort made in operating some processes to hold the temperatures down until after all mixing is completed, by working in batches and heating as quickly as is permissible after the mixing is done. There are certain limitations to methods that work by batches. If the quick heating is not regulated there will be a rush of hydrocyanic acid that will overtax the receiving equipment. Many evils, such as foaming and entrainment of liquid, must be reckoned with and they are of such importance that as a practical operation the liquid must not be heated too rapidly. Furthermore, a large batch of liquid cannot be heated in excess of a certain speed because of the inherent difficulties in the way of introducing the heat. There is, therefore, a certain loss of hydrocyanic acid by hydrolysis which cannot be avoided, which loss occurs when the batch is heated above 80° C. and before all hydrocyanic acid is expelled.

There are two principal sources of hydrocyanic acid from cyanide. The first source is the alkali metal cyanides; the second is the alkaline earth cyanides. Other classes of cyanides are used but they are of less importance. The first class is easier to use because solid phases do not appear to a great extent in the reacting solutions. Hence, strong solutions can be used; batches are relatively small for a given output, mixing is relatively easier and the small bulk of liquid as also the low viscosity, make easy and quick the removal of hydrocyanic acid before hydrolysis has produced large amounts of ammonia.

When alkaline earth cyanides are used with sulphuric acid, solid phases of sulphate result. The mixtures become so pasty with these solids that relatively much more water must be used than with alkali cyanides. At best, the mixing is relatively difficult and the elimination of hydrocyanic acid is correspondingly slow and incomplete. As might be expected, losses by hydrolysis are relatively high.

If a large batch of strong sulphuric acid is introduced into a generator and cyanide solution or slurry is added thereto, it is difficult, if not impossible, to prevent local superheating and at the same time local superacidifying at the point where the two liquids mix. This condition causes, even during the brief interval of time of its duration, a considerable loss by hydrolysis. This is particularly true if the batch is or quickly becomes a slurry.

I first discovered that it was possible to run two streams, one of sulphuric acid and the other of cyanide solution or slurry, together in a specially designed mixer and to get them perfectly mixed without any significant loss of hydrocyanic acid by hydrolysis and to withdraw the solutions at temperatures of from 70° to 80° C. without either artificial heating or refrigeration. Concentrated acid is preferred, but I have obtained satisfactory results with weaker acids, such as chamber acid. That is to say, if the two liquids are run in at ordinary temperatures the heats of dilution and of reaction will raise the liquids to the temperature given.

I then discovered that a mixture prepared as indicated above could be continuously run into and through a trough shaped vessel, vigorously heated and agitated with live steam, moved to and through an outlet and discharged as sludge containing as low a percent of hydrocyanic acid as can be produced by boiling in a generator used for batches.

I have successfully combined these two operations of continuous rapid mixing and of continuous rapid heating and the result has been a marked improvement in the art of generating hydrocyanic acid from cyanides.

I will now describe equipment that can be used, for example, to produce hydrocyanic acid from raw materials containing approximately 50% of calcium cyanide along with miscellaneous other compounds such as the chlorides and sulphates of alkalies and alkaline earths.

A complete assembly of the equipment is shown in the accompanying Figure 1. A cross section of the heating vessel is shown in Figure 2. 1 is a funnel shaped vessel, preferably lined with lead. 2 is a side view of the heating equipment. This has a V shaped cross section as shown in Figure 2 and its length depends upon the capacity required. 3 is a separator for removing entrained liquids from the evolved gas. The generating vessel 1 is connected to the heater 2 by the pipe 4. HCN gas, water vapor and entrained liquids pass off from the mixer and the heater by pipes 5 to the lead separator 3 whence the gas passes through pipe 7 to whatever receiving equipment is needed, which may be either an absorber or rectifying column. In the mixer 1 is a conical shaped vessel 8 centrally located, open at the top, supported by arms 10 and provided with an annular curtain 9, supported from the upper edge of the vessel 8. Centrally located in the vessel 8 but sufficiently high to function properly is a propeller 11, driven by a shaft projecting through a stuffing box above. 12 is an overhead supply tank for strong sulphuric acid. This acid passes through a liquid valve 13 and pipe 14 into the bowl 8 of the mixer. Valve 13 is supplied with a suitable dial so that a constant flow of acid may be maintained. Cyanide solutions or slurries are held in tank 15. The solutions or slurries pass through regulating valve 16 similar to regulating valve 13 and through pipe 17 into the bowl 8 of the mixer. 18 is a manifold providing live steam into steam lines 19, 20, 21, 22, 23 and as many more steam lines as may be needed in the heater. 24 is a trap for spent liquids or slurry and the pipe 6 leads from the end of the heater to beneath the liquid or slurry level in the trap.

To operate this process the propeller 11 is started at a previously determined speed which speed will depend upon the size and rated capacity of the equipment. This speed should be approximately determined by trial for every piece of equipment. A stream of sulphuric acid is then introduced into the bowl 8 and immediately thereafter a stream of cyanide solution or slurry. It is necessary to previously calibrate the dials on valves 13 and 16 so that for whatever rate of output is desired the two streams will properly correspond. When the two streams are running full there should always be a slight excess of acid. This is necessary because if the system becomes alkaline ammonia is liberated from the solution due to hydrolysis of the hydrocyanic acid. For many purposes this is highly undesirable. I have found that there is no difficulty in maintaining a proper relationship between the two supplies of liquid. The simultaneous introduction of the two liquids combined with the action of the propeller 11 results in an almost instantaneous mixing of the two liquids and their instantaneous elevation of temperature due to heats of reaction and of dilution. The liquid remains in the bowl 8 for a few seconds only, it being thrown outward and upward over the edge of the bowl after which it goes down by gravity along the curtain 9 to the inner wall of the cone of the vessel 1. These hot mixed liquids pass down the inner wall of the vessel and through pipe 4 into a heater 2. The operation of mixing the liquids and of throwing them over the edge of the bowl 8 is continuous and there is therefore a steady evolution of hydrocyanic acid gas from the liquid which gas passes out through pipe 5 to trap 3. As has been indicated only a few seconds intervene between the entrance of the liquids through their respective pipes and the exit of the mixture through pipe 4. The liquid level in the heater 2 is determined by the position of the outlet pipe 6 at which point there is a constant gravity overflow which continues as long as there is an input of liquid through pipe 4. The steam pipes 19 to 23, inclusive, discharge live steam at the bottom of the heater and they therefore produce a rapid heating and an agitation. The heating results in rapid elimination of the hydrocyanic acid gas and the agitation due to the use of live steam prevents the settling of any solid phases that may be carried by the liquid or slurry along toward the outlet. Steam pipe 19 brings the liquid almost immediately from the temperature at which it comes to the heater up to the boiling point. The other heating pipes in their turn continue the boiling operation so that before the liquid reaches the exit trap all hydrocyanic acid has been expelled. It will thus be seen that the heating operation is entirely different from that prevailing in larger generators when solutions are being treated as batches, in that liquid from which HCN has been evolved has no way of returning to and mixing with any part of the liquid holding a higher percentage of hydrocyanic acid. All hydrocyanic acid from the heater passes through pipe 5 into the lead separator 3. Thus, there is maintained in the mixer and the heater the same gaseous pressure.

This process is easy to start. It can be operated continuously for indefinite periods and requires little supervision regardless of the capacity at which it is being run. Since the excess of acid is at all times very small and since the total time interval elapsing from the time of mixing to the time of discharging is never more than a few minutes the losses due to hydrolysis of HCN are held at a low figure.

This is a continuous process but it can, of course, be operated intermittently. In my claims when I use the word "continuous" I wish it to be interpreted to mean a process that can be operated without interruption for long periods if such is desirable.

I claim:

1. The process which consists in continuously forming a liquid mixture of acid and cyanide solution, continuously carrying the mixture away from fresh supply of either ingredient, and separately collecting the evolved gas and the residue.

2. The process which consists in continuously forming a liquid mixture of acid and cyanide solution into a thin film moving away from fresh supply of either ingredient, and separately collecting the evolved gas and the residue.

3. The process which consists in continuously forming a liquid mixture of acid and cyanide solution, continuously flowing the mixture over a conical surface away from fresh supply of either ingredient, and separately collecting the evolved gas and the residue.

4. The process of continuously producing hydrocyanic acid which consists in continuously mixing acid and solution of cyanide in such manner that completed mixture is carried away from fresh supply of either ingredient, continuously heating the moving mixture out of contact with other more or less spent portions, continuously collecting the evolved gas, and discharging the effluent.

5. The process of continuously producing hydrocyanic acid from sulphuric acid and solutions of cyanides, consisting in continuously mixing the ingredients in such a manner that the mixed liquids leave the point of mixing quickly, continuously heating the ingredients so mixed in such a manner that no portion of the liquid has an opportunity to mix with other more or less spent portions, and continuously discharging the effluent so formed.

6. The process of continuously producing hydrocyanic acid which consists in continuously mixing acid and solution of cyanide in such manner that completed mixture is carried away from fresh supply of either ingredient, continuously heating the moving mixture out of contact with other more or less spent portions, continuously collecting the evolved gas, heating and agitating the effluent to free it of gas, and collecting such gas.

7. The process of continuously producing hydrocyanic acid which consists in continuously mixing acid and solution of cyanide in such manner that completed mixture is carried away from fresh supply of either ingredient, continuously heating the moving mixture out of contact with other more or less spent portions, continuously collecting the evolved gas, heating and agitating the effluent to free it of gas, and collecting such gas together with that first evolved.

8. The process of continuously producing hydrocyanic acid consisting in bringing moving streams of acid and cyanide solution into contact, accelerating the movement after contact while mixing and heating, collecting the evolved gas, discharging the mixture away from the zone of heating, and further heating the mixture and collecting the evolved gas.

9. The process of continuously producing hydrocyanic acid from sulphuric acid and solutions of cyanides consisting in continuously mixing the ingredients in such a manner that the mixed liquids leave the point of mixing quickly, continuously heating the ingredients so mixed in such a manner that no portion of the liquid has an opportunity to mix with other portions that have been subjected to either more or less heating, continuously discharging the effluent so formed, and recovering the hydrocyanic acid produced.

Signed at New York city, in the county of New York and State of New York this 9th day of January, A. D. 1924.

MORTIMER JAY BROWN.